US008893526B2

(12) United States Patent
Liu et al.

(10) Patent No.: US 8,893,526 B2
(45) Date of Patent: Nov. 25, 2014

(54) METHOD AND EQUIPMENT FOR MANUFACTURING CURVED GLASS SHEET

(75) Inventors: Shyan-Juh Liu, New Taipei (TW); Chu-Sheng Chen, New Taipei (TW); Wei-Ping Li, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/299,549

(22) Filed: Nov. 18, 2011

(65) Prior Publication Data

US 2013/0081428 A1  Apr. 4, 2013

(30) Foreign Application Priority Data

Sep. 30, 2011  (CA) .......................... 2011 1 0297328

(51) Int. Cl.
*C03B 23/035* (2006.01)
(52) U.S. Cl.
CPC .................................. *C03B 23/0352* (2013.01)
USPC ................................................. 65/94; 95/287
(58) Field of Classification Search
CPC .................................................... C03B 23/0352
USPC ....................... 65/93–94, 106–107, 273, 285, 65/287–291; 264/1.32–1.35
See application file for complete search history.

(56) References Cited

U.S. PATENT DOCUMENTS

| | | | | |
|---|---|---|---|---|
| 2,123,552 A | * | 7/1938 | Helwig | 425/140 |
| 2,333,076 A | * | 10/1943 | Stewart | 65/67 |
| 3,600,150 A | * | 8/1971 | Rougeux | 65/268 |
| 3,939,538 A | | 2/1976 | Hellman et al. | |
| 4,859,225 A | | 8/1989 | Kuster et al. | |
| 4,878,826 A | * | 11/1989 | Wendt | 425/384 |
| 5,669,952 A | * | 9/1997 | Claassen et al. | 65/106 |
| 6,009,725 A | | 1/2000 | Hirota et al. | |
| 6,099,765 A | * | 8/2000 | Yamanaka et al. | 264/2.4 |
| 6,321,570 B1 | * | 11/2001 | De Vries et al. | 65/104 |
| 6,668,589 B1 | * | 12/2003 | Mizusugi et al. | 65/106 |
| 2004/0079112 A1 | * | 4/2004 | Inoue et al. | 65/29.11 |
| 2004/0107729 A1 | | 6/2004 | Fukami et al. | |
| 2004/0107731 A1 | * | 6/2004 | Doehring et al. | 65/81 |
| 2004/0129028 A1 | * | 7/2004 | Balduin et al. | 65/106 |
| 2010/0316847 A1 | * | 12/2010 | Schillert et al. | 428/174 |
| 2011/0236631 A1 | * | 9/2011 | Bisson et al. | 428/141 |

FOREIGN PATENT DOCUMENTS

| | | | | |
|---|---|---|---|---|
| CN | 1100071 A | | 3/1995 | |
| CN | 101423323 A | | 5/2009 | |
| JP | 61222933 A | * | 10/1986 | C03B 23/03 |
| JP | 01176530 A | * | 7/1989 | |

* cited by examiner

*Primary Examiner* — Jodi C Franklin
(74) *Attorney, Agent, or Firm* — Novak Druce Connolly Bove + Quigg LLP

(57) ABSTRACT

A method for manufacturing curved glass sheet includes the following: an equipment, including a matching first mold core and a second mold core, is provided; a raw glass sheet is provided and placed on the second mold core covering second mold cavity; a pressure is controlled in the first and second mold cavities to a first pressure; the mold cores are closed and heated, to raise the raw glass sheet to a temperature of about glass transition temperature of raw glass sheet; a gas is supplied into the first mold cavity to raise the pressure in the first mold cavity to a second pressure which is greater than first pressure, in which the raw glass sheet is bent to the second forming surface of second mold core under pressure; mold cores are opened and cooled down to obtain the curved glass sheet.

8 Claims, 9 Drawing Sheets

METHOD AND EQUIPMENT FOR MANUFACTURING CURVED GLASS SHEET

BACKGROUND

1. Technical Field

The present disclosure generally relates to a method and an equipment for manufacturing a glass sheet, and particularly to a method and an equipment for manufacturing a curved glass sheet.

2. Description of Related Art

In recent years, curved glass sheets are employed as glazing display panels in electronic devices such as mobile phones. Such curved glass sheets are conventionally produced by gravity bending methods. In a typical gravity bending method, a raw glass sheet is heated to a temperature which is equal to or higher than a glass transition temperature of the raw glass sheet, and then the glass sheet is conveyed to a lower mold having an inner concave surface. The raw glass sheet is pressed to the inner concave surface by gravity to form the curved glass sheet. However, in the gravity bending method, a profile deviation of the curved glass sheet is unduly great. In order to lower the profile deviation of the curved glass sheet, the gravity bent glass sheet supported by the lower mold is further pressed by an upper mold to a desired shape. However, a roughness of the inner and outer concave surfaces of the curved glass sheet is relatively high because an inner concave surface of the obtained curved glass sheet contacts the upper mold, and an outer convex surface of the obtained curved glass sheet contacts the lower mold. Additionally, surface defects on the surfaces of the obtained curved glass sheet are increased due to the contact between the molds and the surfaces of the glass sheet.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the method for manufacturing curved glass sheet and the mold employed in the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
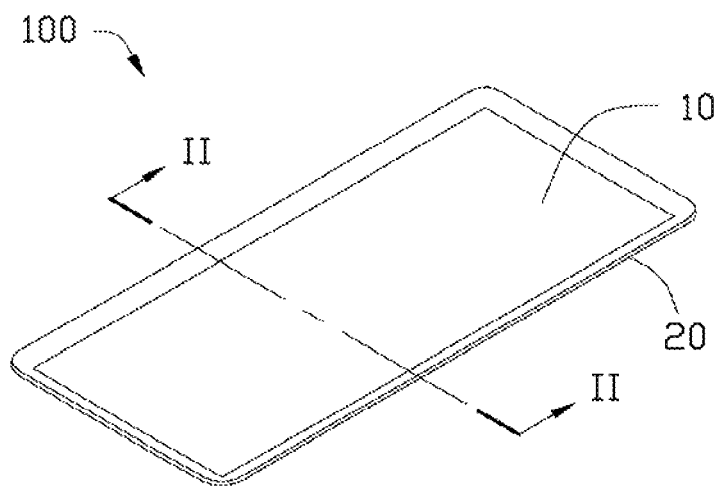
FIG. 1 shows an isometric view of a curved glass sheet of a first embodiment.
Figure 2:
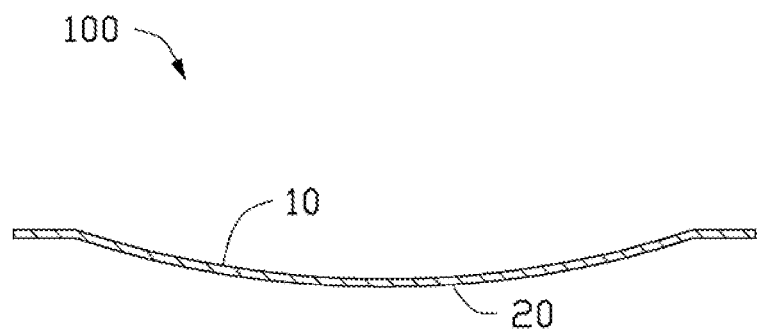
FIG. 2 shows a cross section of the curved glass sheet, taken along line II-II of FIG. 1.
Figure 3:
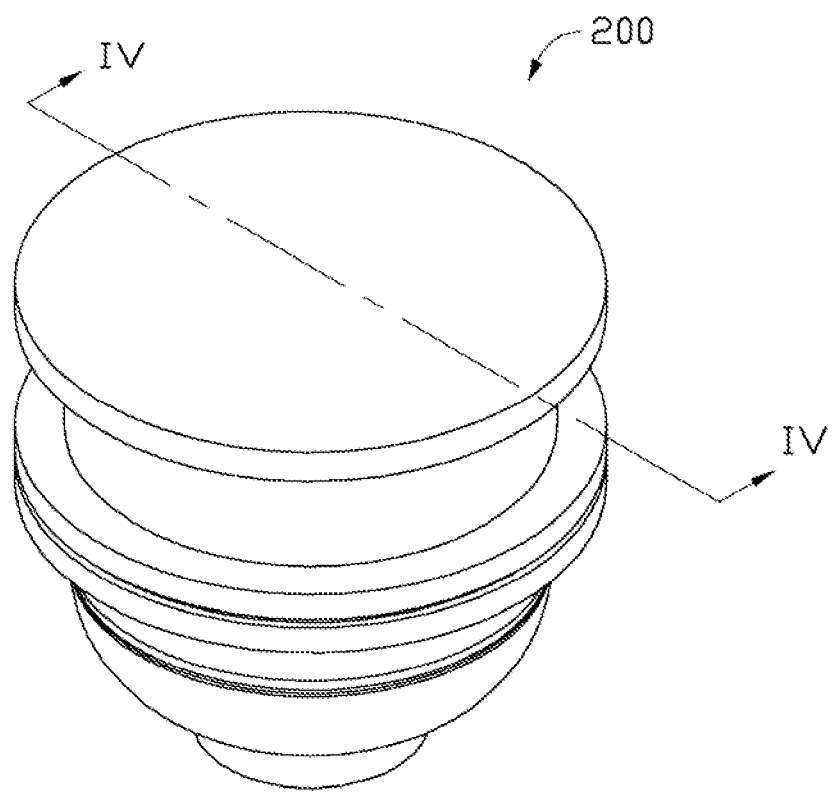
FIG. 3 shows an isometric view of an equipment for manufacturing the curved glass sheet of FIG. 1 of the first embodiment, in which the equipment includes a chamber and a mold, and a raw glass sheet is placed in the mold.
Figure 4:
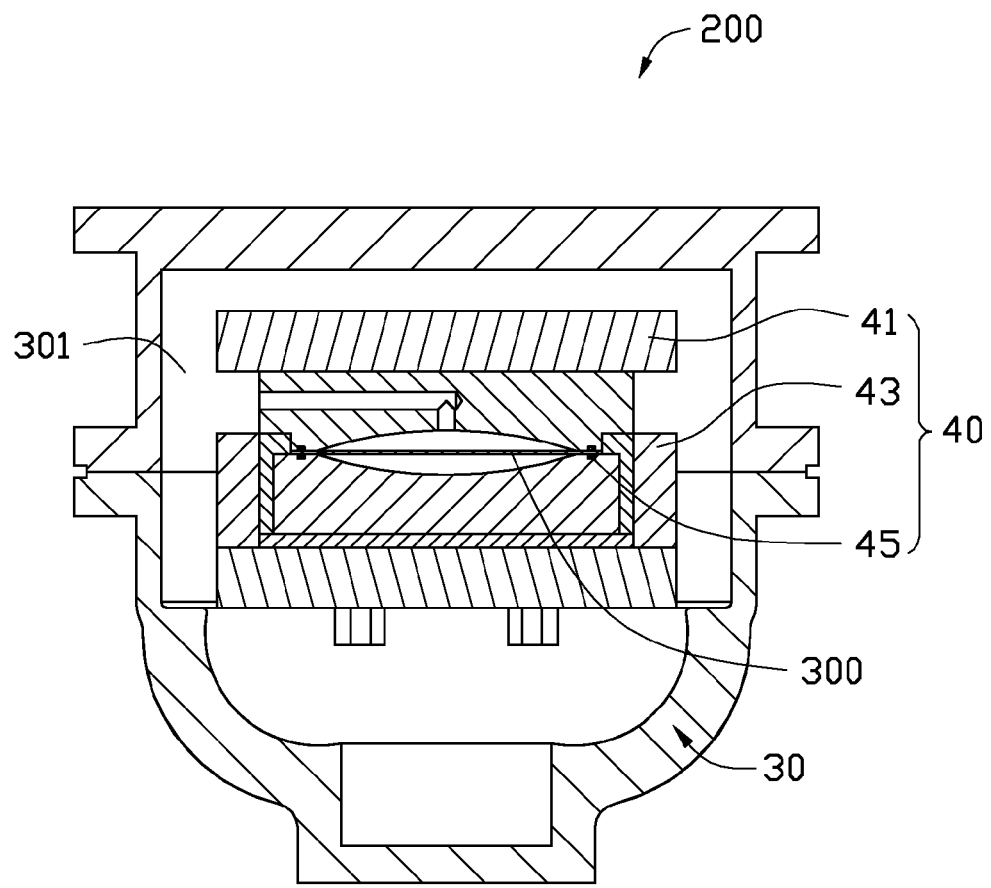
FIG. 4 shows a cross-section of the equipment taken along line IV-IV of FIG. 3.

Referring to FIGS. 1 through 4, a first embodiment of an equipment 200 for manufacturing a curved glass sheet 100 is presented. The equipment 200 includes a chamber 30 and a mold 40. A receiving space 301 is defined in the chamber 30. The mold 40 is securely placed in the receiving space 301. A temperature and a pressure in the chamber 30 can be controlled. A curved glass sheet 100 is a substantially arc-shaped sheet, and includes an inner concave surface 10 and an outer convex surface 20 opposite to the inner concave surface 10.

Figure 5:
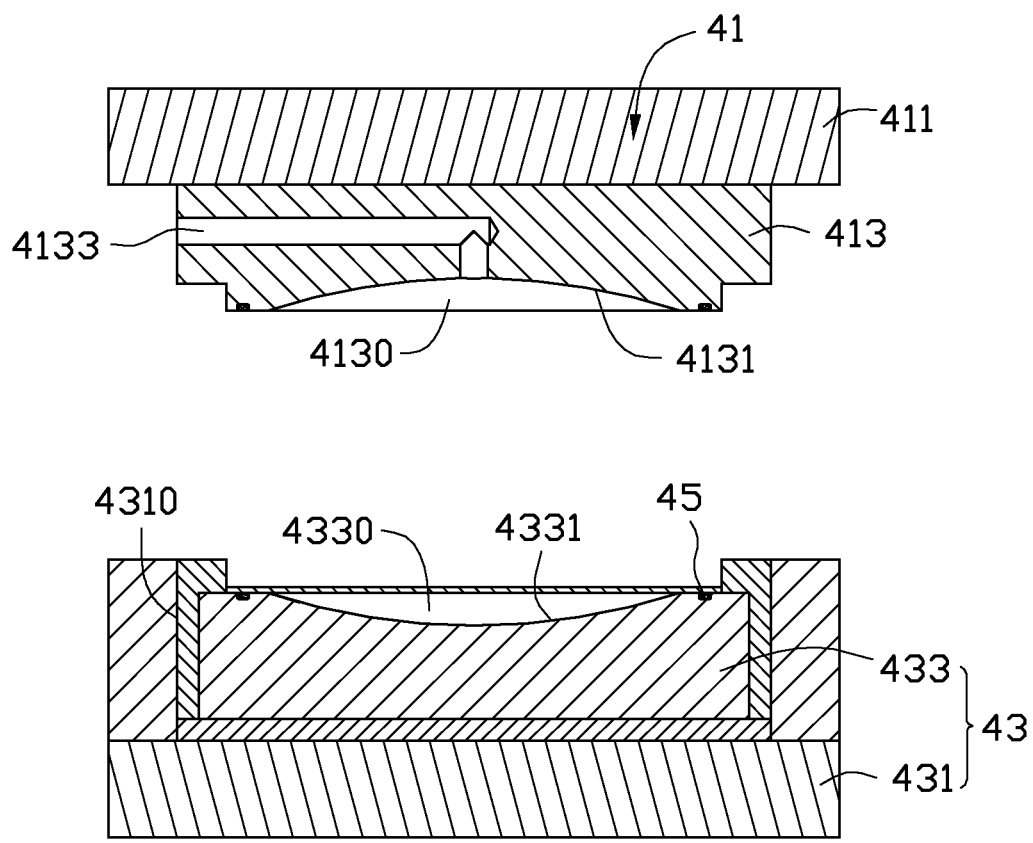
FIG. 5 shows a cross-section of the mold that is open, in which a raw glass sheet is placed.
Figure 6:
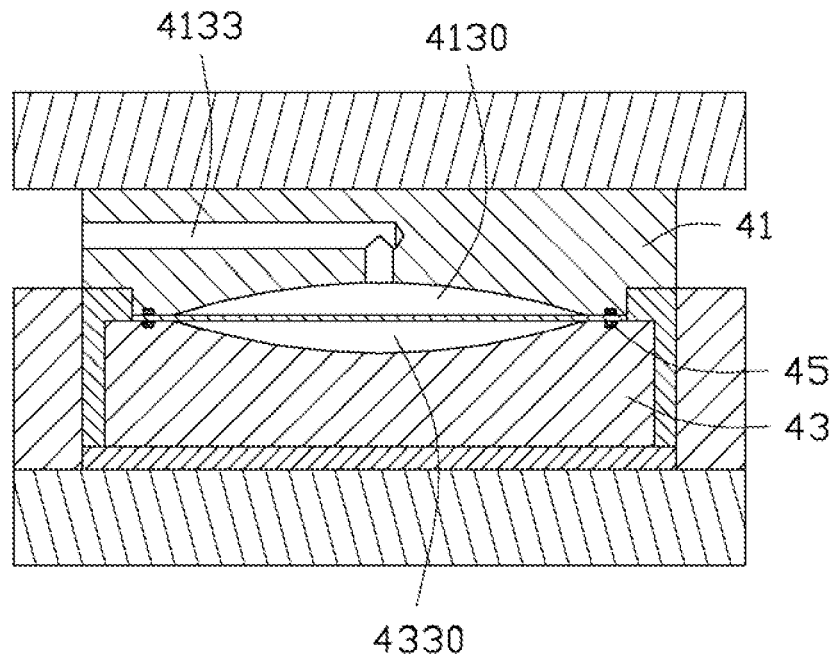
FIG. 6 is similar to FIG. 5, but shows a cross section of the mold in a closed state.
Figure 7:
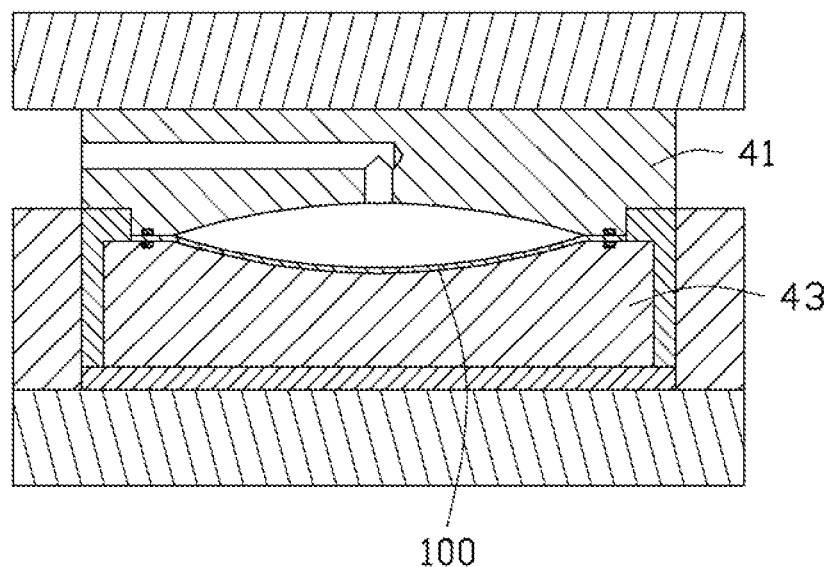
FIG. 7 shows a cross-section of the mold, and the curved glass sheet formed in the mold.

Also referring to FIG. 5, the mold 40 includes a first mold 41, a second mold 43 matching with the first mold 41, and two sealing rings 45 sandwiched between the first mold 41 and the second mold 43. The first mold 41 includes a first fixing member 411 and a first mold core 413. The first mold core 413 is securely connected to the first fixing member 411. A first mold cavity 4130 is defined in a center of the first mold core 413, and forms a first forming surface 4131 facing the second mold 43. A communicating hole 4133 is also defined in the first mold core 413. One end of the communicating hole 4133 is communicated with the first mold cavity 4130, and the other end of the communicating hole 4133 is communicated with the receiving space 301 of the chamber 30, such that a pressure in the first mold cavity 4130 can be controlled by controlling the pressure in the chamber 30.

The second mold 43 includes a second fixing member 431 and a second mold core 433. A receiving cavity 4310 is defined in a center of the fixing member 431. The second mold core 433 is securely placed in the receiving cavity 4310. A second mold cavity 4330 is defined in a center of the second mold core 433, and forms a second forming surface 4331 facing the first forming surface 4131.

In the first embodiment, a shape of the second mold cavity 4330 matches with that of the outer convex surface 20 of the curved glass sheet 100. A shape of the first mold cavity 4130 matches with that of the inner concave surface 10 of the curved glass sheet 100. The shape of the first mold cavity 4130 can be of other shapes such as a square. In the first embodiment, the first mold core 413 and the second mold core 433 are made of high temperature ceramics. The first mold core 413 and the second mold core 433 can also be made of other materials such as graphite.

The two sealing rings 45 are configured around the first mold cavity 4130 and the second mold cavity 4330, respectively, such that the first mold cavity 4130 and the second mold cavity 4330 can be sealed. In the first embodiment, the sealing ring 45 is made of high temperature ceramics, which has a long lifetime. In an alternative embodiment, a quantity of the sealing rings 45 can be one, or in yet another embodiment, the sealing rings 45 can even be completely omitted. In an illustrated embodiment, a heated raw glass sheet can act as a sealing ring to seal the first mold cavity 4130 and the second mold cavity 4330.

In an alternative embodiment, two or more molds 40 can be placed in the receiving space 301 within the holding capacity of the chamber 30, such that a production efficiency can be improved., and in yet another embodiment, the chamber 30 can even be omitted. In an illustrated embodiment, the mold 40 can be placed in a sealed container connected to a pressure generating module, such that the pressure in the mold 40 can be controlled. And a heating module is placed in the mold 40, such as a plurality of induction heating coils, or a resistance heater.

Also referring to FIGS. 5 through 7, and FIG. 9, an embodiment of a method for manufacturing the curved glass sheet 100 employing the equipment 200 of the first embodiment is illustrated as follows.

In step S101, a chamber 30 is provided. A receiving space 301 is defined in the chamber 30. A temperature and a pressure in the chamber 30 can be controlled.

In step S102, a mold 40 is provided, and is securely placed in the receiving space 301 of the chamber 30. The mold 40 includes a first mold 41, a second mold 43 matching with the second mold 43, and two sealing rings 45. The two sealing rings 45 are sandwiched between the first mold 41 and the second mold 43.

In step S103, a raw glass sheet 300 is provided, and is placed on a second mold core 433 of the second mold 43, covering a second mold cavity 4330 of the second mold core 433 and the sealing rings 45.

In step S104, the chamber 30 is evacuated to make the second mold cavity 4330 substantially in a vacuum state.

In step S105, the mold 40 is closed. The two sealing rings 45 tightly contacts each other when pressed by the first mold 41, such that the second mold cavity 4330 is substantially sealed.

In step S106, the temperature in the chamber 30 is controlled, and the raw glass sheet 300 is heated to a temperature of about the glass transition temperature of the raw glass sheet 300.

In step S107, a gas is supplied into the chamber 30 to make the pressure in the first mold cavity 4130 equal to or higher than $1.0 \times 10^5$ Pa, such that the raw glass sheet 300 is bent and adhered to the second forming surface 4331 under the elevated pressure.

In step S108, the mold 40 is opened, and is cooled down to obtain the curved glass sheet 100.

In the step S107, the pressure in the first mold cavity 4130 can be slightly lower than $1.0 \times 10^5$ Pa, as long as the raw glass sheet 300 at its glass transition temperature can be bent under a pressure difference on two sides of the raw glass sheet 300. The gas supplied into the chamber 30 can be an inert gas, such as nitrogen or argon. Thus, the raw glass sheet 300 is protected from reacting with impurities, and a surface of the curved glass sheet 100 has an improved quality. The method for manufacturing the curved glass sheet 100 can further include an annealing step to the curved glass sheet 100 after the step S108, for relieving the internal stress of the curved glass sheet 100.

During the manufacturing process of the curved glass sheet 100 employed the equipment 200, the inner concave surface 10 is kept away from the mold 40, such that a roughness of the inner concave surface 10 is relatively low, and a surface quality of the inner concave surface 10 is improved. Additionally, the raw glass sheet 300 is under pressure, such that the raw glass sheet 300 tightly adheres to the second forming surface 4331. Thus, a profile deviation of the curved glass sheet 100 can be reduced. Finally, the mold 40 and the raw glass sheet 300 are heated evenly in the chamber 30, such that the profile deviation of the curved glass sheet 100 can be further reduced.

If the profile deviation of the curved glass sheet 100 has a relatively wide range, in the step S107, the raw glass sheet 300 can be bent to a predetermine degree to keep away from the second forming surface 4331. Thus, the inner concave surface 10 and the outer convex surface 20 have a relatively low roughness, and a relatively high surface quality.

Figure 8:
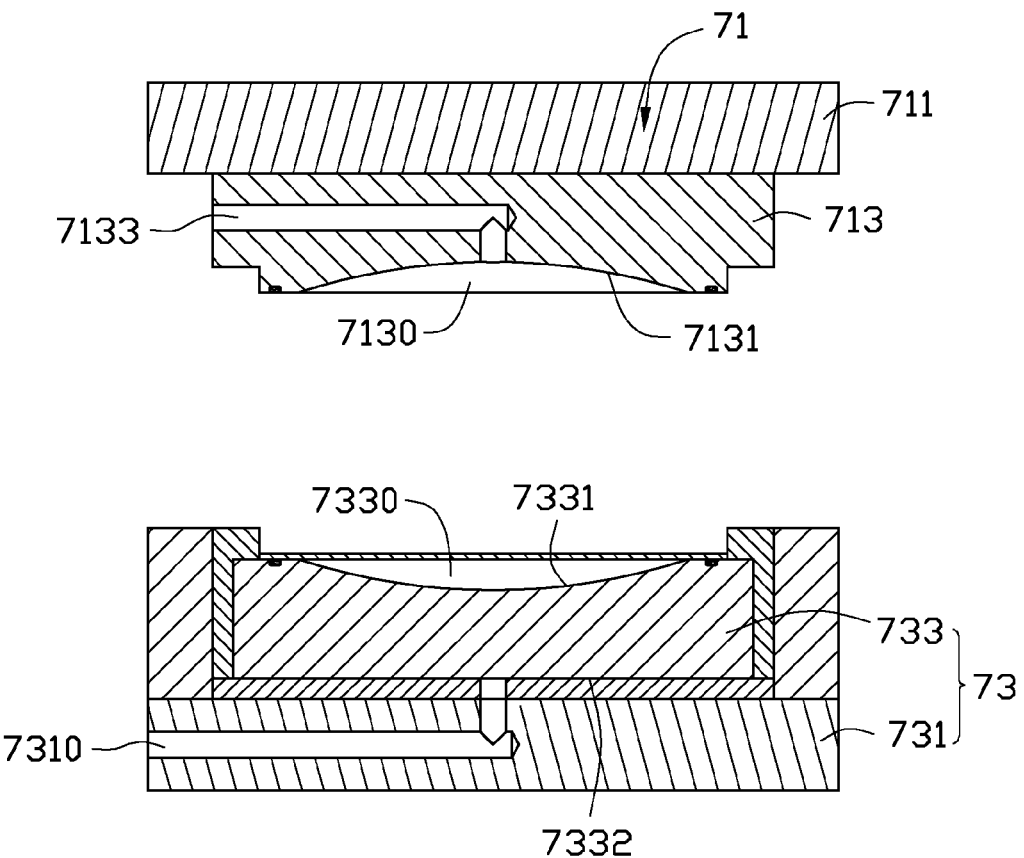
FIG. 8 shows an isometric view of a mold of an equipment for manufacturing the curved glass sheet of FIG. 1 of a second embodiment, in which a raw glass sheet is placed in the mold.
Figure 9:
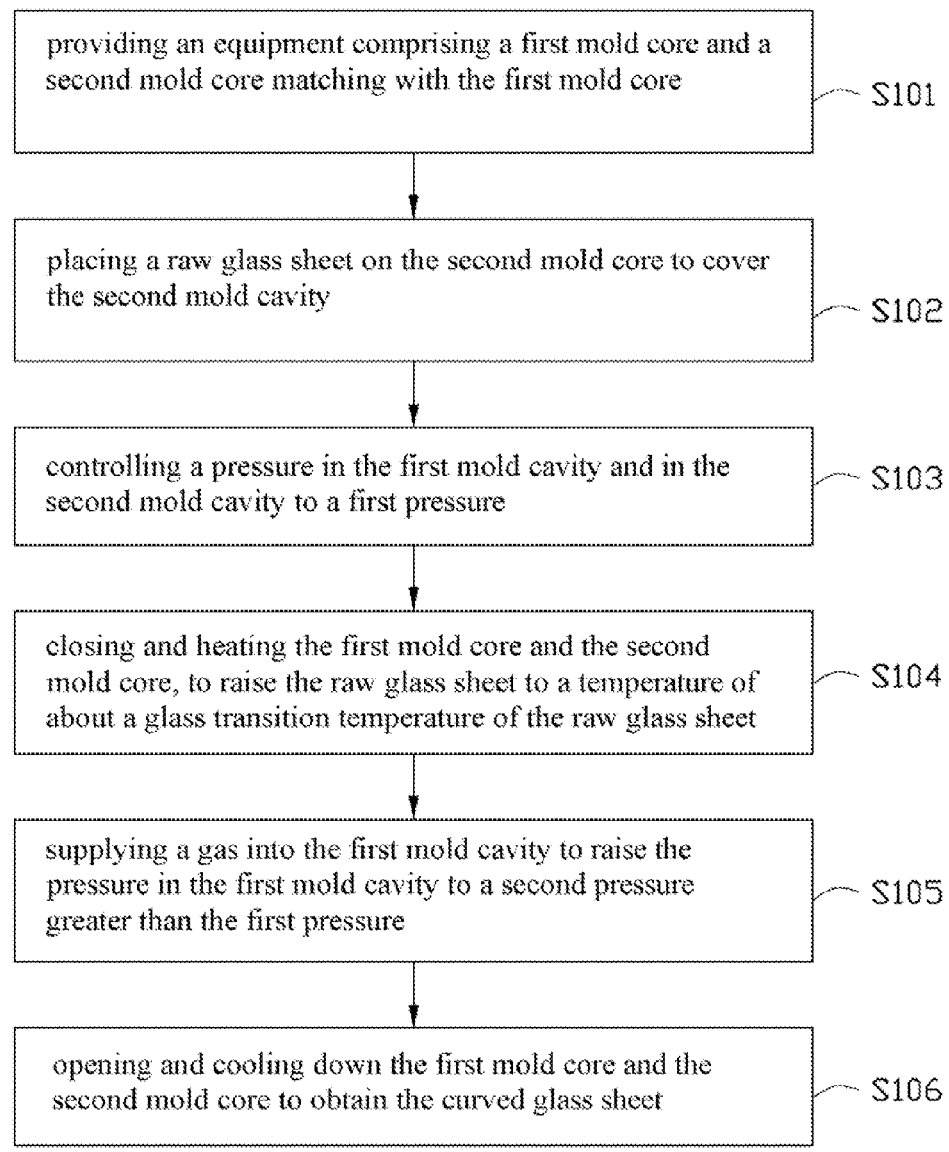
FIG. 9 is a flowchart showing a method for manufacturing the curved glass sheet of FIG. 1.

Referring to FIG. 8, a mold 70 of an equipment of a second embodiment is shown. The equipment of the second embodiment is similar to the equipment 200 of the first embodiment, except that, a second mold core 733 is made of permeable materials, such as porous ceramics or porous graphite. In addition, a communicating hole 7310 is defined in a second fixing member 731 communicating with the second mold core 733. One end of the second communicating hole 7310 of the fixing member 731 is terminated at a bottom surface 7332 of the second mold core 733 opposite from a second forming surface 7331. A pressure generating module is connected to the communicating hole 7310, such that a pressure in a second mold cavity 7330 can be controlled via the communicating hole 7310.

An embodiment of a method for manufacturing the curved glass sheet 200 employing the second embodiment of the equipment is similar to that employing the first embodiment of the equipment 200. However, in the step S104, the second mold cavity 7330 cannot be kept substantially in a vacuum state, but is kept under a first pressure; and in the step S107, a first mold cavity 7130 is kept under a second pressure, which is greater than the first pressure, and the first pressure in the second mold cavity 7330 is maintained or reduced by evacuating through the communicating hole 7310. Thus, a pressure difference on two sides of the raw glass sheet 300 is relatively great, and the raw glass sheet 300 adheres to the second forming surface 7331 more tightly. In the illustrated embodiment, the first pressure is substantially lower than about $1.0 \times 10^2$ Pa, and the second pressure is substantially higher than about $1.0 \times 10^5$ Pa.

Because the pressure in the second mold cavity 7330 can be reduced through the communicating hole 7310 during the manufacturing process of the curved glass sheet 200, the pressure difference on two sides of the raw glass sheet 300 can be sustained. Thus, the profile deviation of the curved glass sheet 100 can be further reduced. The curved glass sheet 100 is formed more quickly when provided with a lower first pressure, such that the profile deviation of the curved glass sheet 100 is further reduced.

In an alternative embodiment, the chamber can be omitted, and a heating module can be placed in the mold, such as a plurality of induction heating coils, or a resistance heater, and a communicating hole 7133 and the communicating hole 7310 are respectively connected to two pressure generating modules to control the pressure in the first mold cavity 7130 and in the second mold cavity 7330. The first pressure and the second pressure can not be limited in the above-mentioned pressure range, and a pressure difference between the first pressure and the second pressure can be changed as a material of the raw glass sheet 300 is also changed, so as to adapt a deformability of the raw glass sheet 300.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method for manufacturing curved glass sheet, comprising steps as follows:

providing an equipment comprising a first mold core and a second mold core opposite to the first mold core, the first mold core defining a first mold cavity and forming a first forming surface facing to the second mold core, the first mold core further defining a first communicating hole communicated with the first mold cavity, the second mold core made of a plurality of permeable materials, the second mold core defining a second mold cavity and forming a second forming surface facing the first forming surface, the equipment further comprising a fixing member, the second mold core fixedly connected to the fixing member, and the fixing member defining a second communicating hole communicated with the second mold core, wherein one end of the second communicating hole of the fixing member is terminated at a bottom surface of the second mold core opposite from the second forming surface;

placing a raw glass sheet on the second mold core to cover the second mold cavity;

controlling a pressure in the first mold cavity to a first pressure, and a pressure in the second mold cavity to the first pressure, wherein the first pressure is lower than the atmosphere;

closing and heating the first mold core and the second mold core after controlling the pressure in the first mold cavity and the second mold cavity, to raise the raw glass sheet to a temperature of about a glass transition temperature of the raw glass sheet;

supplying a gas into the first mold cavity to raise a pressure in the first mold cavity to a second pressure, the second pressure is higher than the first pressure, wherein the raw glass sheet is bent to the second forming surface of the second mold core under a pressure difference on two sides of the raw glass sheet; and opening and cooling down the first mold core and the second mold core to obtain the curved glass sheet.

2. The method for manufacturing curved glass sheet of claim 1, wherein the first pressure in the second mold cavity is sustained or reduced by evacuating, when a gas is supplied into the first mold cavity.

3. The method for manufacturing curved glass sheet of claim 1, wherein the gas supplied into the first mold cavity is an inert gas.

4. The method for manufacturing curved glass sheet of claim 1, wherein the equipment further comprises a chamber, the first mold core and the second mold core are fixedly placed in the chamber, and a pressure and a temperature in the chamber is controllable.

5. The method for manufacturing curved glass sheet of claim 1, wherein the equipment further comprises at least one sealing ring sandwiched between the first mold core and the second mold core to seal the first mold cavity.

6. The method for manufacturing curved glass sheet of claim 5, wherein a quantity of the sealing ring is two, and the two sealing rings are configured around the first mold cavity and the second mold cavity, respectively.

7. The method for manufacturing curved glass sheet of claim 1, wherein the permeable material of the second mold core is a porous ceramics or a porous graphite.

8. The method for manufacturing curved glass sheet of claim 1, wherein a receiving cavity is defined in the fixing member, and the second mold core is fixedly placed in the receiving cavity.

* * * * *